United States Patent
Esteve

(10) Patent No.: US 7,644,656 B2
(45) Date of Patent: Jan. 12, 2010

(54) LIQUEFIER

(75) Inventor: Felipe Maria Moreno Esteve, Moncada (ES)

(73) Assignee: Zumex Maquinas Y Elementos, S.A. (ES)

(*) Notice: Subject to any disclaimer, the term of this patent is extended or adjusted under 35 U.S.C. 154(b) by 0 days.

(21) Appl. No.: 11/665,899

(22) PCT Filed: Sep. 15, 2005

(86) PCT No.: PCT/ES2005/000499

§ 371 (c)(1),
(2), (4) Date: Apr. 20, 2007

(87) PCT Pub. No.: WO2006/045864

PCT Pub. Date: May 4, 2006

(65) Prior Publication Data

US 2007/0261571 A1      Nov. 15, 2007

(30) Foreign Application Priority Data

Oct. 22, 2004  (ES) ............................ 200402487 U

(51) Int. Cl.
     *A47J 19/02*   (2006.01)
(52) U.S. Cl. .......................................... 99/511; 99/513
(58) Field of Classification Search ........... 99/509–513,
         99/492, 495, 348; 366/297–300, 314, 601,
         366/205, 291; 241/37.5, 92, 282.1, 282.2;
         494/36, 37, 43, 47; 210/360.1, 380.1; 426/61,
         426/63, 533, 599, 231–233
See application file for complete search history.

(56) References Cited

U.S. PATENT DOCUMENTS

| 2,343,327 | A |   | 3/1944  | Reynolds             |
|-----------|---|---|---------|----------------------|
| 3,185,304 | A | * | 5/1965  | Bradley ...... 210/232 |
| 3,428,182 | A | * | 2/1969  | Hillebrand ...... 210/369 |
| 4,183,293 | A | * | 1/1980  | Arao et al. ...... 99/512 |
| 4,345,517 | A | * | 8/1982  | Arao et al. ...... 99/511 |
| 5,495,795 | A |   | 3/1996  | Harrison et al.      |
| 6,813,997 | B1 |  | 11/2004 | Lin                  |
| 6,862,982 | B1 |  | 11/2004 | Wang                 |

FOREIGN PATENT DOCUMENTS

| DE | 1244350 | 7/1967 |
|----|---------|--------|
| GB | 2041727 | 9/1980 |

* cited by examiner

*Primary Examiner*—Timothy F. Simone
(74) *Attorney, Agent, or Firm*—Thompson & Knight LLP; James J. Murphy

(57) ABSTRACT

Conventional type liquefier appliance that incorporates an anti-drip system consisting of a "T"-shaped spout seal, besides the inclusion of a series of non-slip strips on the connecting gears between the drive unit and the rotary elements, which enable it to come to a sudden stop without the inertia of said elements forcing them in an upward direction, furthermore the grater disc is not fixed to the drive element by a through-screw but rather said screw is welded to its under side, while in addition the push piston terminates in a concavity which engages the piece to be liquefied during use and wherein said piston may be replaced by a feed hole reducer piston.

9 Claims, 9 Drawing Sheets

LIQUEFIER

CROSS REFERENCE TO RELATED APPLICATION

This application is a national application of PCT/ES2005/000499, which claims priority to ES U200402487, filed Oct. 22, 2004.

FIELD OF INVENTION

The present invention relates to an improved liquefier appliance that surpasses what has been available to date in that it includes an anti-drip system, an improvement in the drive rotation system between the motor and the module containing the grater disc, a system for attaching the grater disc to the grip module, a special configuration of the push piston for the vegetable pieces to be liquefied, a reducer for the hole for the feeding of the pieces to be juiced, a top lid pressure seal by means of a handle-like piece, and a rear cooling air outlet from the base of the appliance.

BACKGROUND OF INVENTION

There are different types of liquefier on the market, each with features that vary depending on whether they are going to be put to professional catering or household use.

The one proposed here improves upon existing types in the aspects that are set out hereinunder.

One of the problems usually encountered by liquefiers is the dripping of liquid from the outlet spout after grating fruit or vegetables, as the residues that remain in the filter or on the actual grater disc continue to ooze slowly and several minutes may go by before this dripping finally ceases.

The use of shut-off cocks is not advisable as they necessarily have to consist of various parts with the increased risk of breakage and difficulty in cleaning and, furthermore, in the event of the cock being closed when proceeding to make use of the liquefier, the juice may overflow from the appliance.

The liquefier proposed here accommodates an inverted L-shaped hollow tubular piece, preferably of flexible material, in the end of the juice outlet spout so that the juice runs through its interior, flowing to the exterior from the opposite end to that inserted in the spout, and once the juice is served, this piece can be easily turned, with the result that the end from which the juice drops, opposite to the end inserted in the spout, is directed upwards, while said piece acts as a reservoir and collects the drops that may remain inside the liquefier, thus preventing them from dripping out.

Another of the aspects that is improved by the invention proposed here is the drive system or coupling between the motor and the rotary piece containing the filter and the grater disc.

Of the different existing systems, one of the most successful is that combining a male rotary drum, integral with the motor, in the sides of which a series of diagonal grooves are machined. These grooves, angled in the direction of motor rotation, engage with shoulders provided on another female drum, which fits on the male one and supports the grater disc and the filter.

The fact that the side grooves are angled in the direction of rotation means that the faster this rotation, the closer the connection between one piece and the other will be.

This solution generates problems, however, when it is intended, as is the case here, that the liquefier should be brought to a complete standstill when so desired by the user or as a result of the accidental opening of the top lid, as in these circumstances the actual inertia of the piece on which the grater disc and the filter rest causes it to be forced out.

The above-mentioned problem has been overcome in the present invention by including strips of silicone or other non-slip material on the edges of the inclined notches, which will bear higher pressure in case of a sudden stop, thus generating greater friction and preventing the piece from lifting.

The grater disc is also designed to offer a better performance than on other liquefiers, as in these the aforesaid disc is attached to the rotary piece by means of a screw threaded into a through-hole or else by way of some other integral, non-removable means.

The use of a through-screw created two problems, as on the one hand its head reduced the area of the grater sensibly, precisely at the centre, and on the other it represented an additional piece when it came to cleaning the parts of the appliance.

The liquefier that is proposed here possesses a grater disc, to which the screw securing it to the rotary piece is welded on the under side, or else attached there by some other means that will assure a strong lasting connection, the grater disc proper being converted into the head of this attach screw, so that the whole area the grater disc can be utilized to the full.

Another of the problems that commonly arises in liquefiers lies in the way that the fruit or vegetable is forced towards the grater disc, as the standard practice is for the lid sealing the space where the filter and the grater disc rotate to be provided with a hole, usually with a hole with a lower tubular extension down which the fruit or vegetable to be liquefied is fed by means of a hand-operated push piston, thrusting it into said hole in order to press it against the disc.

As a rule, the under side of said push piston, the one in contact with the fruit or vegetable, is usually flat or at the most slightly inclined, with the result that sometimes fruit of a certain size, upon being pressed by a flat surface against a fast rotating disc, moves around in a random fashion inside the tube due to the absence of guidance, impacting against the sides and causing considerable vibration.

The under side of the piston proposed here has a subtle, preferably offset concavity, so that, when the fruit or vegetable is pressed against the grater disc, it cannot escape from such pressure as it is slightly enclosed inside this concavity, which forces it against the angle formed by the grater disc and the filter.

Nevertheless, in spite of the improvement introduced in the push piston, since the feed hole is designed for fruit of a considerable size, there is a series of vegetables, such as carrots for example, which prove difficult to liquefy because of their narrow elongated form, as they drop onto the grating disc and as a result of the rotation they produce the above-mentioned vibration or are even displaced towards the outer edges of the grater disc, with the result that the appliance has to be switched off and opened in order to repeat the feeding operation.

The liquefier proposed here includes a feed-hole reducer consisting of a truncated cone-shaped piece which is inserted into said hole and which is, in turn, traversed over its whole length by a hole of a smaller diameter into which another suitably-sized push piston is inserted.

Another of the facets that is also improved in the liquefier that is the object of the present invention is that relating to the closure of the top lid, which requires a tight seal but at the same time permits easy opening, this being the reason why recourse has sometimes been made to exterior handles, as is the case described in Utility Model U291323, which, upon being lifted, press the lid downwards against the bowl containing the filter, while this lid is released if we lower said handle.

This solution generates problems of use because of the handle being external, as angles and corners awkward for cleaning purposes are created and, furthermore, upon lowering the handle, which has a fulcrum below the filter in order to permit leverage, we run the risk of overturning the jug containing the juice.

To overcome both problems, the liquefier that is the object of the present invention proposes a piece in the form of a handle separate from the liquefier, which facilitates simpler cleaning. In order to fulfill its pressure seal function, said piece is coupled to the liquefier by way of its claw-like ends, which engage with two T-shaped heads that project from the casing and extend towards its interior.

Once the handle-piece is engaged in said heads and upon attempting to press it down, its actual geometry tends to raise the aforesaid heads, which oppose said upward movement due to the action or a spring or elastic element pulling them in the opposite direction, thereby generating in this way sufficient pressure to achieve the tight sealing of the top lid of the liquefier.

When the handle-piece is in the horizontal position of use, it is fully integrated in the geometry of the appliance, thereby facilitating the cleaning jobs and preventing the risk of it getting hooked up, or other such accidents.

Like others, the liquefier that is the object of the present invention has a bin at the pack for collecting the pulp and waste from the liquefying process.

The special design of this bin, with a groove in its inner face, enables the motor cooling air to issue from the rear side of the body of the liquefier, so that, when the bin is in place, no ventilation grille is visible, thereby preserving the motor from the entry of dust or small objects that might damage its operation.

The actual design of the bin ducts the hot air towards the base of the appliance.

SUMMARY OF INVENTION

Although much of what is going to be set forth here has already been said in the previous section, we nevertheless proceed to complete the present section for a clearer understanding of the invention proposed.

As already advanced, inserted in its spout, the liquefier incorporates an anti-drip device consisting of a single piece made from a material that will permit adjustment to the mouth of the spout to prevent leakage.

After being used, when we want the appliance to stop dripping, we turn the whole piece up and the juice outlet end is set on a higher level in relation to the spout, so that the few drops that might ooze out are stored in the actual piece, which acts as a reservoir that will only allow juice to escape in the improbable event of it overflowing due to an excessive buildup. This overflow option is a guarantee to prevent the possibility of the appliance becoming flooded.

To facilitate the turning of this piece, it may be provided with tabs or shoulders so that the user may get a better grip on it.

Rotation between the motor and the juicing element, grater disc, filter and support is transmitted by means of the coupling of two drums, one male and one female, wherein the male drum, integral with the motor, has side grooves inclined in the direction of rotation of the motor and wherein the female drum, which encloses it, has an internal relief that engages in the afore-mentioned grooves in such a way that the faster the rotation the stronger the coupling force between one drum and the other.

On the grooved side, at least on the side that will take up the pressure in the event of the motor coming to a sudden stop, the lower drum has strips of silicone or some other non-slip material such that, even if the motor stops suddenly, the inertia of the upper drum would not cause it to be ejected due to its being retained by the afore-mentioned non-slip strips.

The grater disc used in the liquefier is especially characterised in that the screw that serves to fix said disc to the rotary piece is welded on the under side of said disc or else attached in some other way that will assure a secure and lasting connection, whereby the number of pieces that have to be removed and refitted when cleaning the appliance is reduced and, furthermore, it enables the whole area of the grater disc to be utilized, including additional cutting elements, which results in better and faster juicing.

The piston for exerting pressure on the material to be juiced is especially characterised in that its under side has a preferably offset concavity which enables the fruit or vegetable for juicing to be trapped and imprisoned, preventing it from escaping from the pressure exerted by the push piston and moving around out of control in such a way that it collides with the walls of the tube and generates unnecessary vibration.

For pieces that are smaller-sized than normal or are elongated in shape, as is the case of carrots, a special truncated cone-shaped piece has been designed. Housed in the feed hole, this piece in fact acts as a reducer of same, since it is traversed by a smaller-diameter through-hole that runs along its whole length and enables another push piston to be inserted in it of a size corresponding to this new reduced hole.

For the tight sealing of the whole assembly, a lid has been designed which comprises a piece that is handle-like in its geometry. When duly engaged in heads protruding from the body of the casing, said piece will act as a lever to transfer sufficient pressure to keep the lid closed throughout the juicing process.

This bucket-handle-shaped piece has claw-like ends which, when in the vertical position, enable it to engage with "T"-shaped shoulders or heads protruding from the casing of the liquefier.

When these heads are engaged and the position of the handle is moved down to the horizontal, its actual geometry exerts pressure on said heads, which offer resistance due to the action of an elastic element.

Once the handle-like piece is in the horizontal position, the downward pressure exerted by these "T"-shaped heads is transferred by way of the handle-like piece to the lid that closes the assembly, thereby enabling it to be securely sealed.

If we wish to open the lid, we have to move it to its vertical position and detach it from these heads.

The liquefier that is the object of the present invention has a bin at the back to collect all the liquefied material waste, a feature of said bin being the fact that its inner face is provided with a cavity that is prolonged down to its base, generating a horseshoe-shaped base and thereby enabling the cooling grille of the unit to be located in the rear part of the motor body, such that, when the bin is in place, it is not visible and dust or any other object is unable to enter through it and eventually damage the motor.

The special form of the bin ducts the cooling air to the base of the machine.

BRIEF DESCRIPTION OF DRAWINGS

The figures show graphically the different elements commented on above, although we should point out that the drawings presented here do not show more than one way, but not the only one, of embodying the technical solutions set out in the present report.

DETAILED DESCRIPTION OF THE INVENTION

Figure 1:
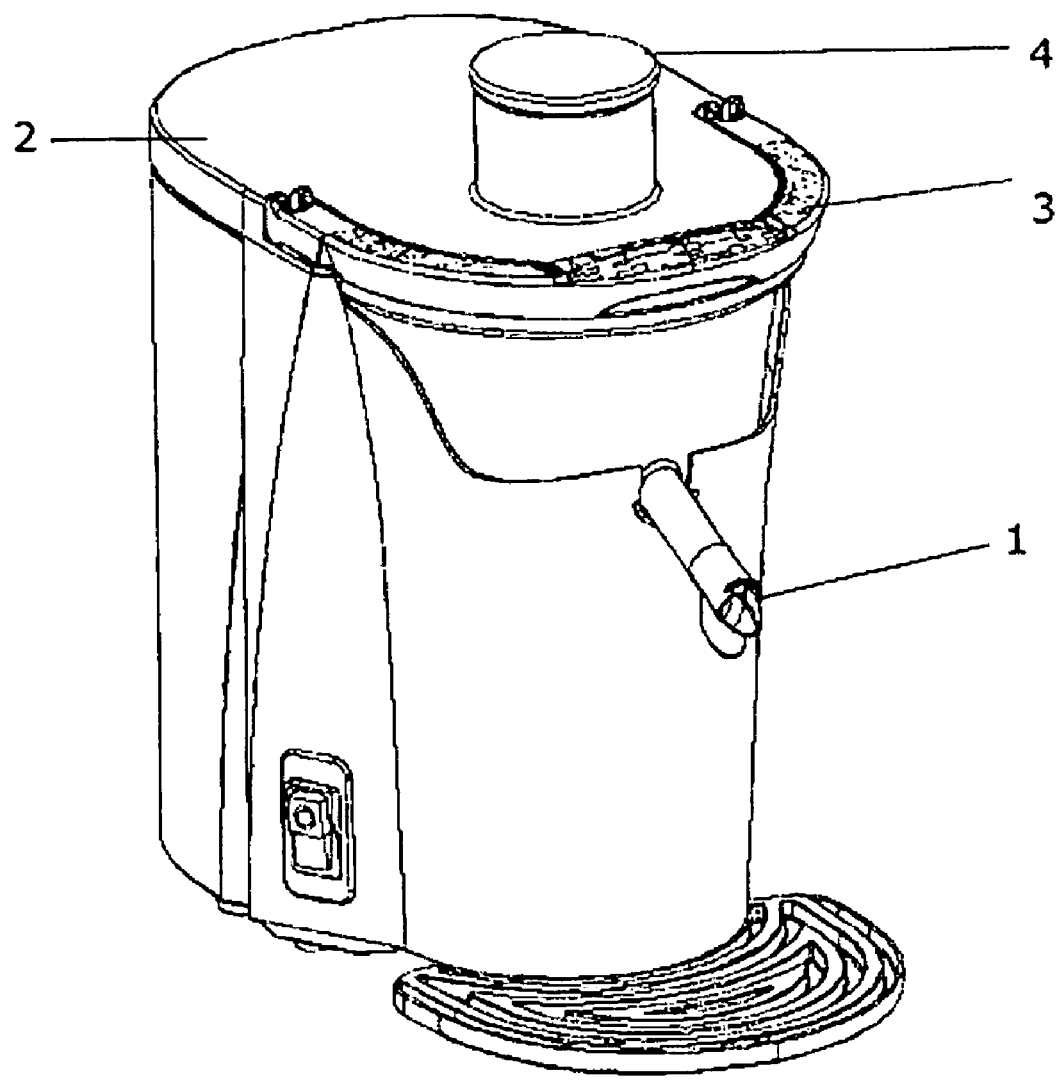
FIG. 1 shows a view of the liquefier as a whole ready for use, wherein we may observe the anti-drip piece (1), the lid that covers the assembly tightly sealed (2), the handle-like piece in the horizontal position integrated into the geometry of the assembly (3), the push piston inserted in the feed hole (4).
Figure 2:
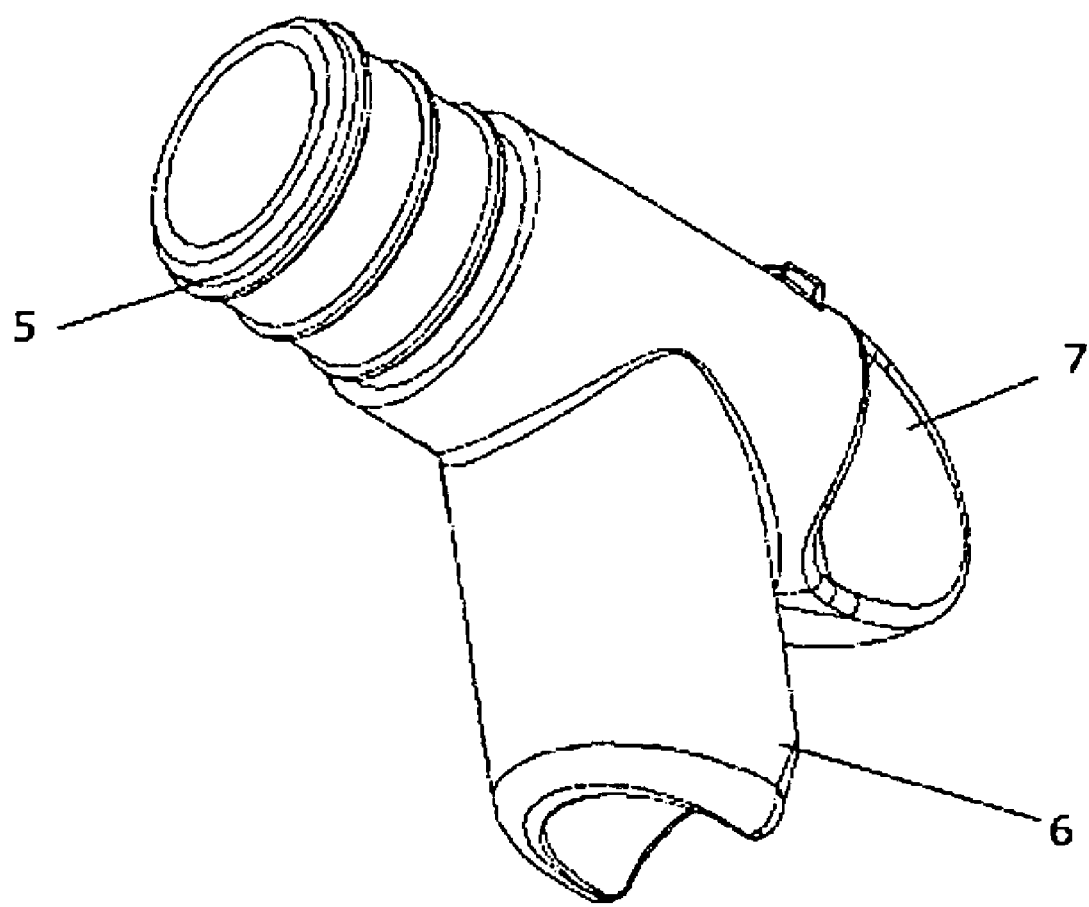
FIG. 2 represents the anti-drip piece, wherein we may observe the portion of same that will be inserted in the liquid outlet spout (5), the part along which the juice runs when it is in the liquefying position (6) and the end (7) which has been used in this specific case to permit its easy turning, although other forms could be adopted that perform the same function.
Figure 3:
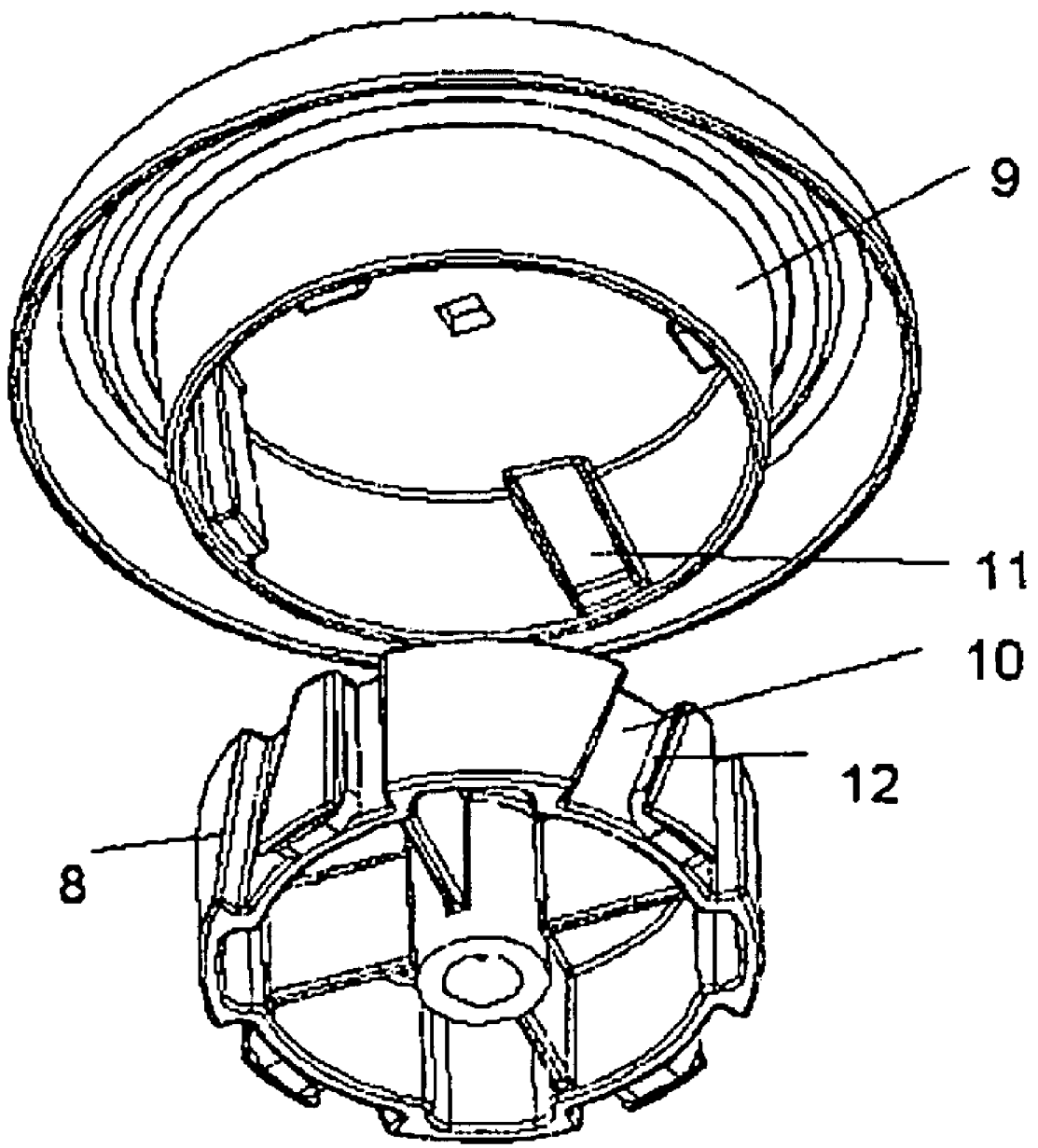
FIG. 3 shows the male drum (8) that transmits the rotation of the motor to the female drum (9) on which the filter and the grater disc are housed. In this figure we may also observe the inclined grooves (10) presented by the male drum (8) which, when both parts are assembled, align with the internal shoulders (11) on the female drum (9), while we may also see the strips of silicone or other non-slip material (12) located on the wall of the afore-mentioned inclined grooves.
Figure 4:
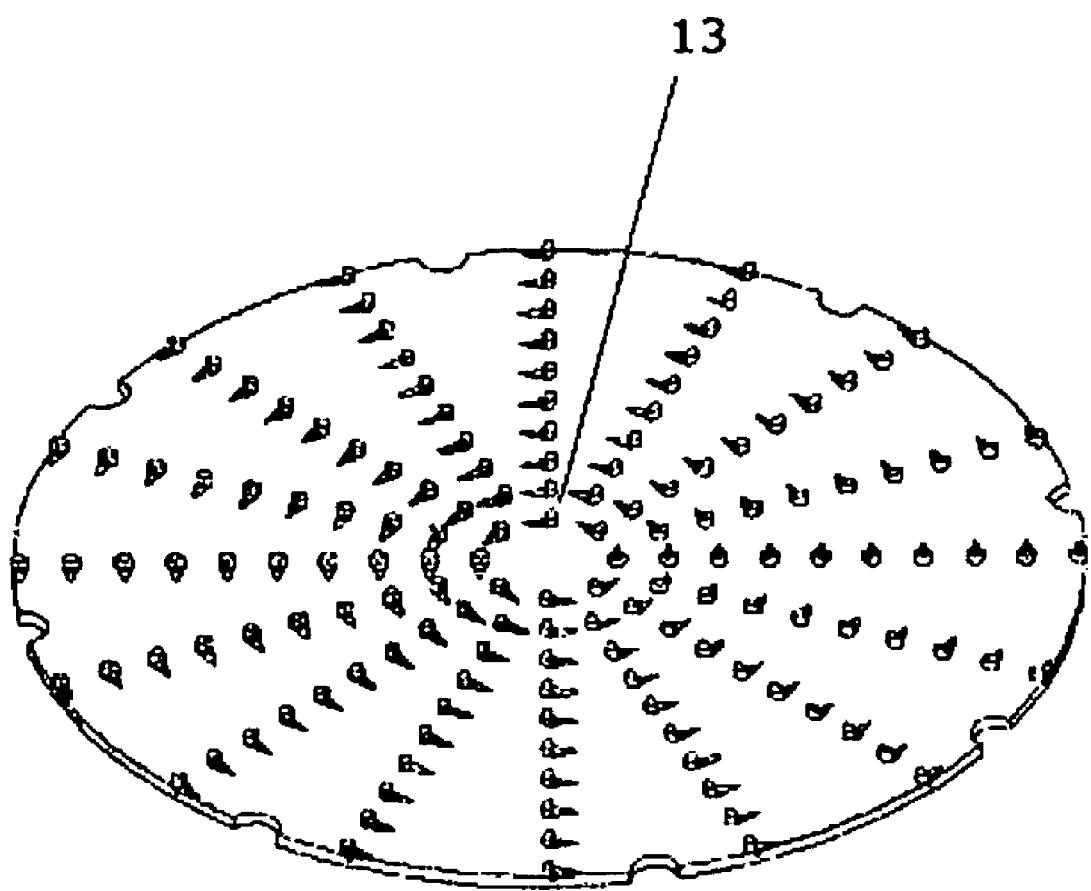
FIG. 4 shows the grater disc with no through-hole, as the screw attaching it to the rotary piece is welded or fixed in some other way to the under side of the disc, which means that better use may be made of its whole area, including cutting elements in the middle of same (13).
Figure 5:
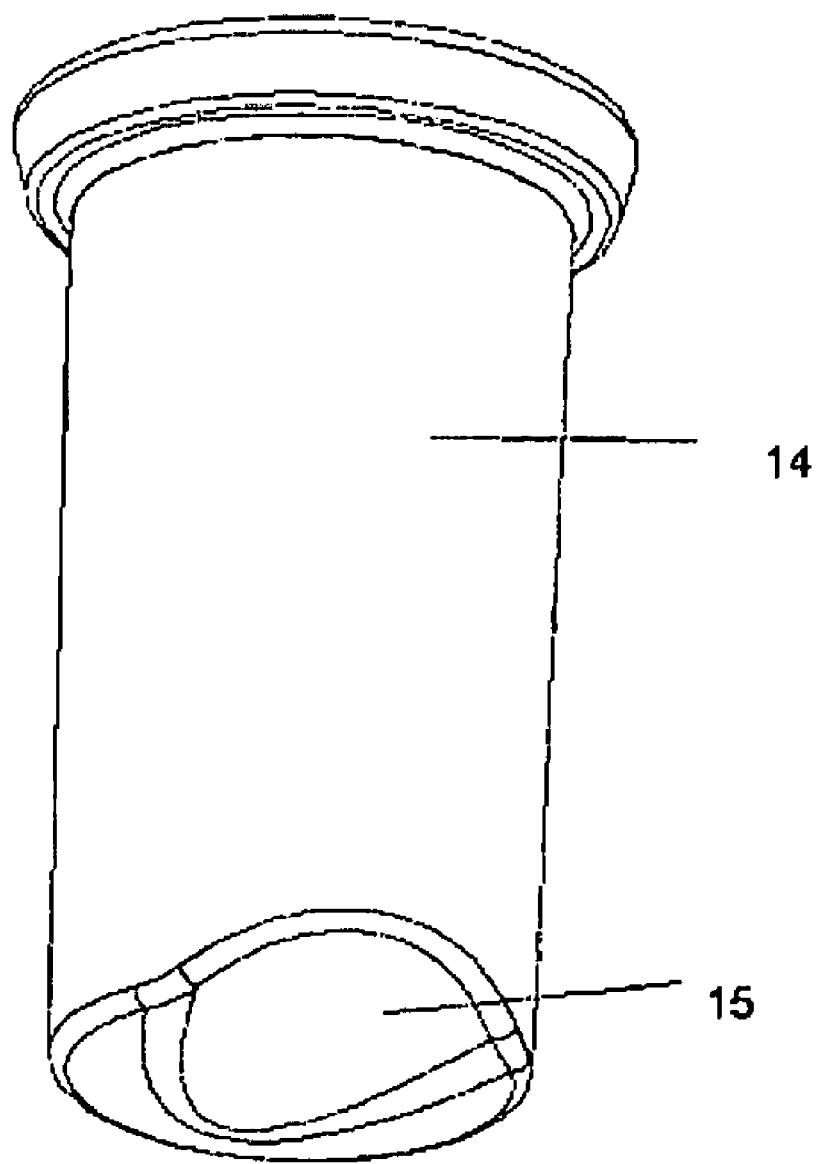
FIG. 5 shows the push piston (14) and a concavity (15) may be observed in its lower end that affects it partly.
Figure 6:
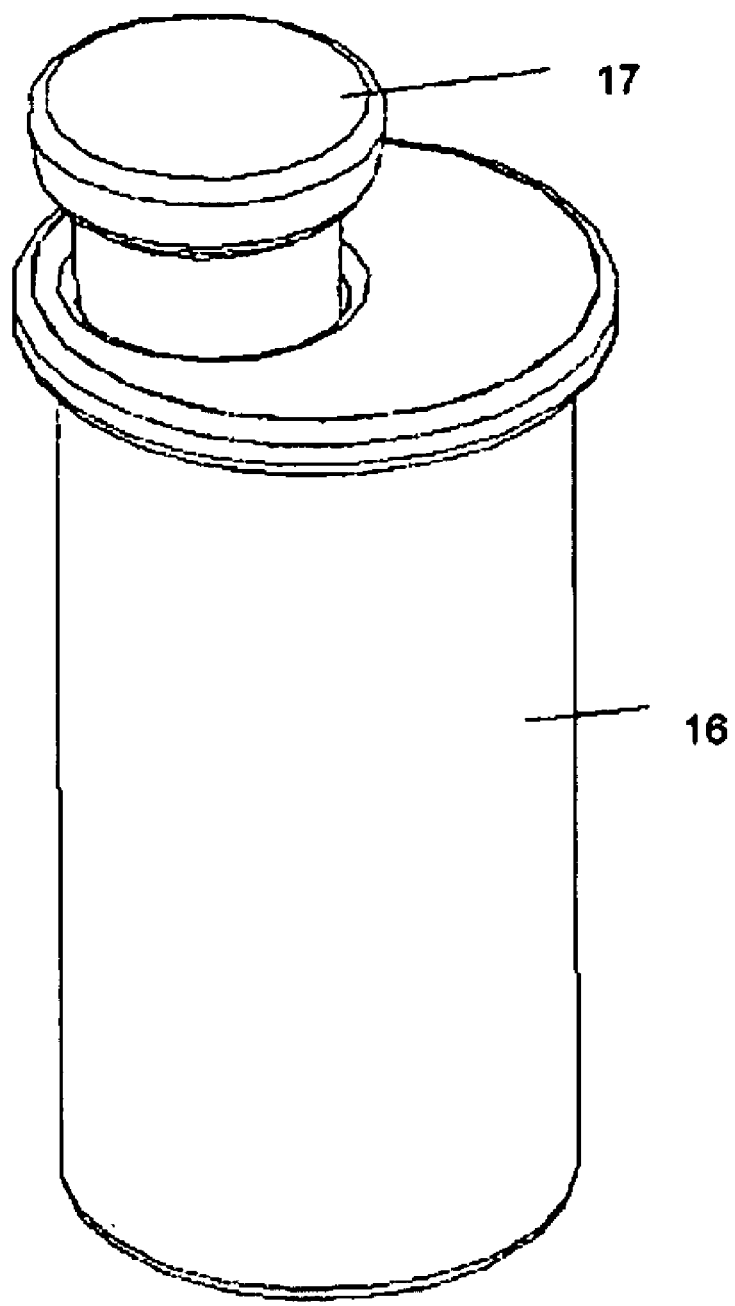
FIG. 6 shows the push piston that performs the functions both of being a reducer for the feed hole (16) and, when inserted in it, of a classic small-sized push piston (17).
Figure 7:
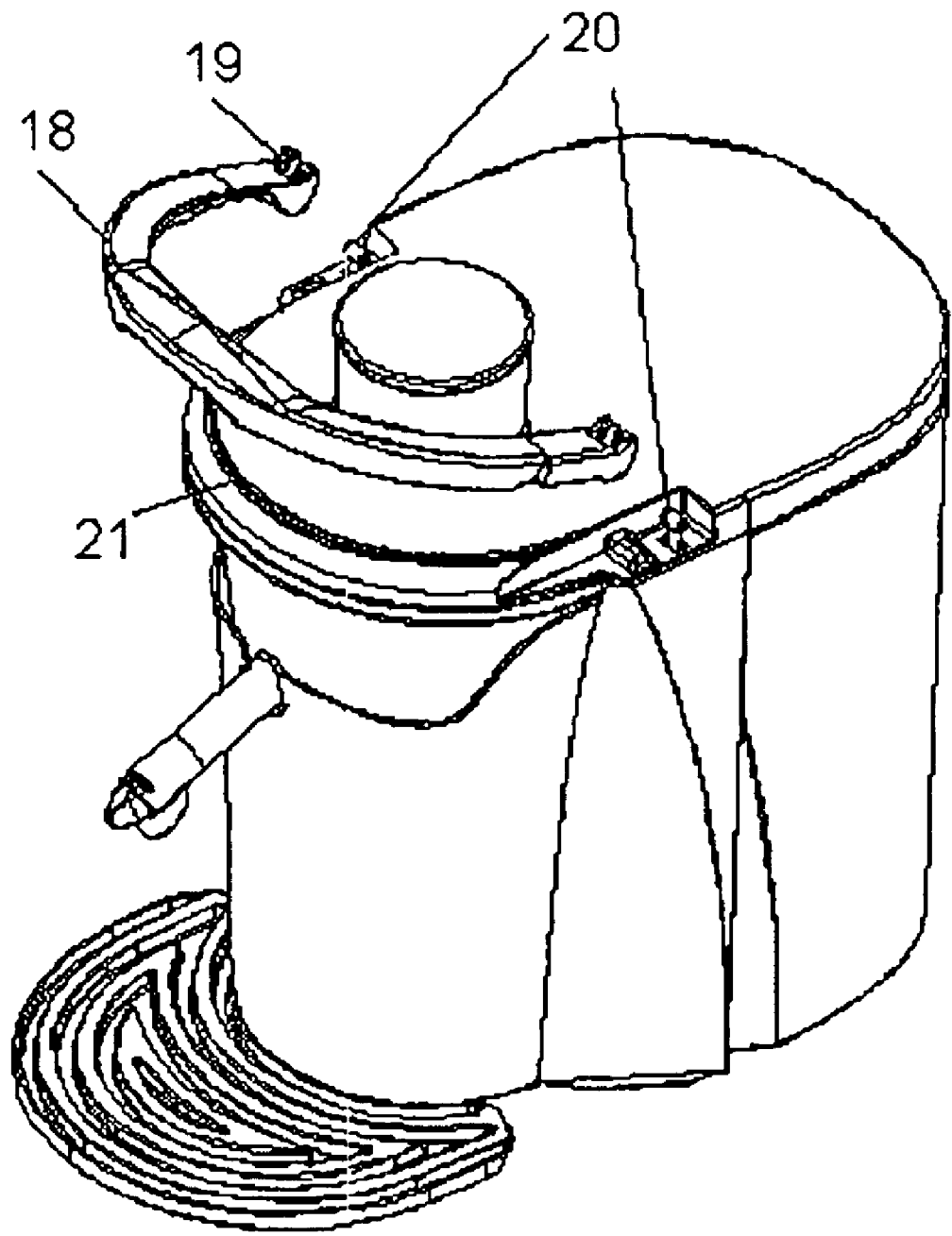
FIG. 7 shows the handle-like piece (18) released from the body of the liquefier and we may see the ends of this piece, which are claw-shaped (19) as well as the "T"-shaped heads (20) that will act as the hinge on which the handle will pivot and which will exert enough pressure on it to keep the lid (21) sealed as long as the juicing operation lasts.
Figure 8:
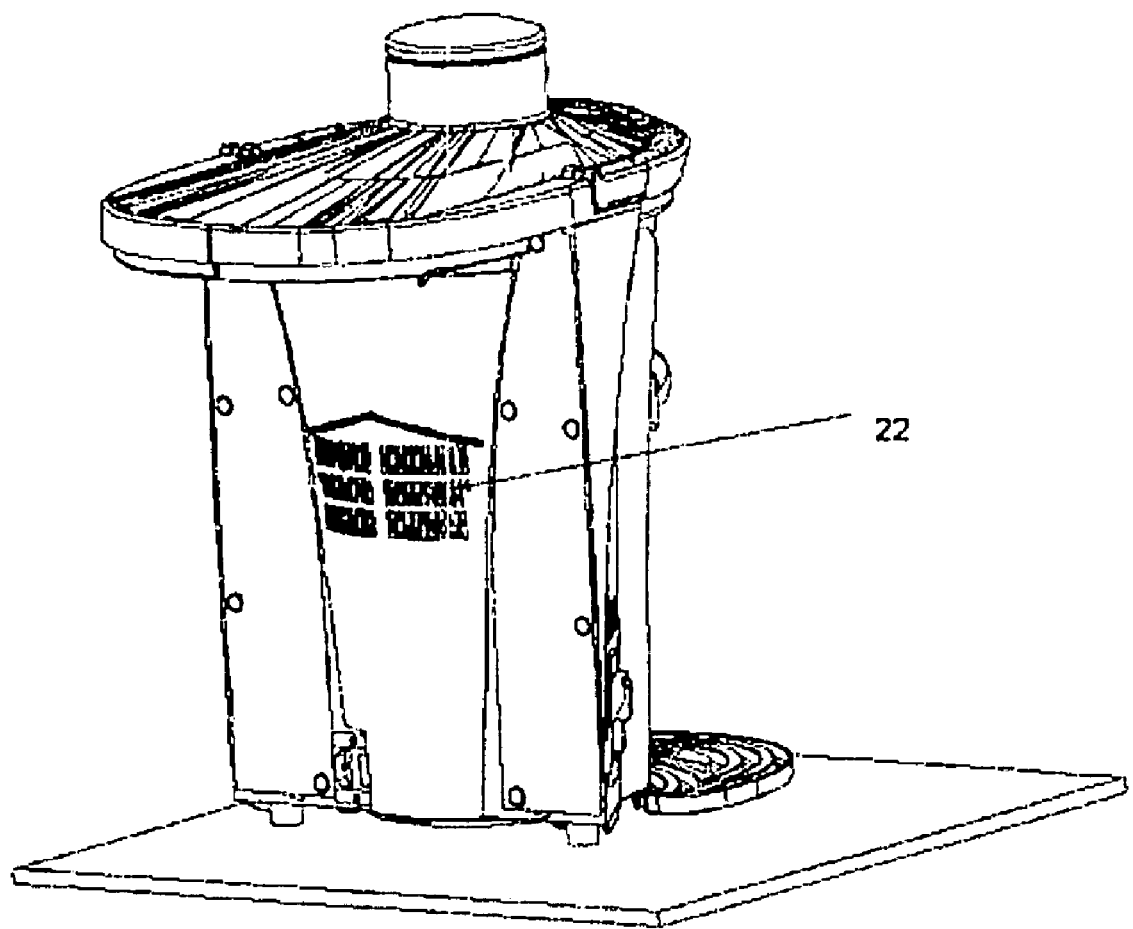
FIG. 8 shows a rear view of the liquefier after removal of the waste bin, wherein we may observe the ventilation outlet groove (22).
Figure 9:
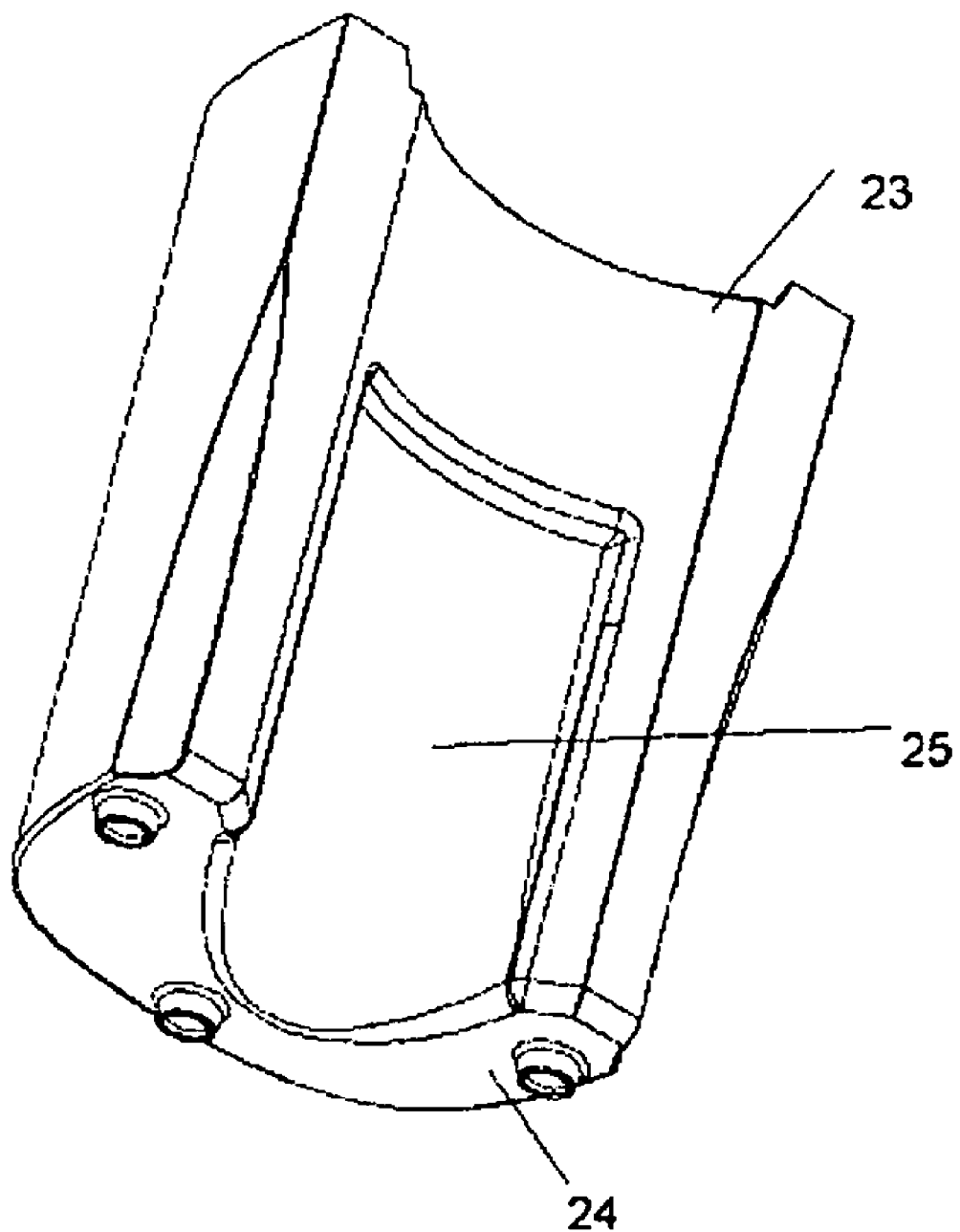
FIG. 9 represents the waste bin (23) with its horseshoe-shaped base (24) and the cavity machined in its inner face (25) which enables the cooling air to issue from the ventilation grille (22) that is located in the rear portion of the appliance.

The present invention consists of an improved liquefier as explained in the earlier sections. We thus find that an inverted hollow "L"-shaped piece (1) is inserted in the end of its outlet spout in such a way that as long as this piece is in the position of use the liquid will flow out normally and when, after the machine has been used, we merely wish to prevent the remains of the juice from dripping, we merely have to turn said piece so that the end where the juice flowed out (6) is set in the upper position and the nozzle therefore is higher than the end of the spout, with the actual piece acting as a reservoir for the possible remains of juice that might still be left, thereby saving any dripping.

Furthermore, the drive action between the motor and the rotary piece which houses the liquefying elements takes place through the coupling of two drums, one male (8) and the other female (9), wherein the male is provided with a series of inclined grooves or recesses (10) in the direction of rotation and the female drum (9) is provided on the inside with shoulders (11) in alignment with the recesses in the male drum.

The inclination of such grooves (10) and shoulders (11) in the direction of rotation means that the faster the speed the closer the connection between both parts.

To prevent the upper part from being forced upwards by the effect of inertia and the inclination of the grooves in the event of the motor coming to a sudden stop, strips of silicone or other non-slip material (12) are incorporated into the sides of the male drum shoulders that would receive the impact in the event of sudden motor stoppage, so that the female drum is prevented from sliding due to the effect of inertia on account of friction being generated that holds it in place.

Another of the technical solutions implemented by the present utility model is that the grater disc proper has the screw fixing it to the rotary piece welded or attached in some other secure and stable fashion to its under side, thereby facilitating the tasks of removal and refitting for cleaning and, in addition, a larger grating area is obtained through not having to set aside the central portion of it for the head of the fixing screw (13).

The fruit and vegetable push piston (14) is especially characterised in that its bottom end is partly dished to form an oval concavity (15) so that the fruit or vegetable to be pressed down is trapped in this concavity, thereby preventing it from being able to escape from the pressure of the piston and moving around freely, causing unwanted impacts and vibration.

The above-described piston design, however, does not prevent certain pieces to be juiced, such as carrots for example, from proving awkward to liquefy on account of their special shape and the diameter of the feed hole, intended for larger-sized fruit, because they continually escape from the push piston.

To overcome this problem, the liquefier incorporates a feed hole reducer (16) consisting of a trunk-shaped piece which is lodged in the feed hole and in which a smaller-diameter hole is made that traverses its whole length and which will be used to accommodate another suitably-sized push piston (17).

One of the questions that has also been improved on this liquefier is that of the sealing of the lid (12) that covers the unit, as said lid requires pressure to prevent unwanted liquid leakage or movement during the juicing process.

In the case at hand the pressure is preferably achieved by elastic pieces or springs that tighten braces terminating in "T"-shaped heads (20), which protrude from the upper part of the liquefier casing.

These "T"-shaped heads will act as a hinge for a handle-like piece (18), which engages with these in its vertical position thanks to its claw-form ends (19).

When the handle-like piece is lowered to its horizontal position, thereby pulling the heads upwards on account of its geometry, it tightens the elastic pieces or springs, thus creating a downward pressure that the handle-like piece (18) transmits to the lid when it rests upon it in the horizontal position and, in addition, because of the actual geometry of the lid and the handle-like piece it is integrated in the former.

To proceed to open the lid, we merely have to raise the handle to the vertical position and disengage it from the "T"-shaped heads, so that it is left free for easy cleaning.

Another of the features of the liquefier that is the object of the present invention is its ventilation outlet grille (22) located in the upper part of its body in such a way that, as the waste bin is located behind this body, the grill is not visible, thereby preventing dust or other elements from entering through it that might cause damage or faults.

This location of the grille is possible thanks to the design of the bin (23), which is provided with a recess (25) in its inner face that lets the air out and re-directs it towards the base of the appliance.

What is claimed is:

1. Improved liquefier of the type based on a drive unit that rotates a grater disc, which, upon receiving a piece of fruit or vegetable from a feed hole, and after grating the piece of fruit or vegetable, forces pulp towards an inverted frustoconical filter having a lower and smaller base which is occupied by the grater disc and an upper base which remains open, such that, due to effects of centrifugal force and an inclination of walls of the filter, the pulp is ejected upwards and is directed by the geometry of a lid sealing the liquefier to a waste bin, whereas, under the action of the centrifugal force, juice falls through the filter and is collected and ducted to a juice outlet spout, comprising:

a rotating "L"-shaped tubular piece inserted in the juice outlet spout for preventing dripping when the liquefier is not producing juice;

a female drum for supporting the grater disk and having a concentric aperture defined therethrough;

a male drum for engaging a motor of the drive unit and adapted to be received in the aperture defined through the female drum;

a plurality of strips of non-stick material disposed in a space between surfaces of the male and female drums;

a folding handle-like piece having claw-like ends that engage corresponding T-shaped heads on the liquefier for sealing the lid during liquefying;

a push piston adapted to be received in the feed hole and having a cavity with an opening adapted to receive another push piston therein; and wherein the waste bin includes sidewall with a recess corresponding to a ventilation grill on the liquefier for redirecting airflow output from the ventilation grill.

2. Improved liquefier, according to claim 1, wherein the hollow tubular "L"-shaped piece includes one end inserted in the juice spout proper, while an other end forms a nozzle whereby the juice finally flows while the piece is in a use position and wherein the configuration of the piece permits its rotation, taking the spout proper as the axis, until the nozzle is positioned upwards, so that said nozzle is above the level of the spout and, acting as a reservoir, collects drops that might otherwise ooze out of the appliance.

3. Improved liquefier, according to claim 1, wherein the male drum presents a series of grooves inclined in the direction of rotation and the female drum, when coupled on the male drum, presents a series of shoulders, which align with the grooves in the male drum, wherein in the grooves in the male drum, or on the shoulders of the female drum, in those areas which would be subjected to greater pressure in the event of rotation ceasing abruptly, the strips non-slip material are located in such a way that the higher the pressure between contact surfaces, the greater the adhesion between the contact surfaces.

4. Improved liquefier, according to claim 1, wherein firmly fixed to an under side by means that assure a solid connection, the grater disc has a screw that will secure attachment to the drive unit, with the result therefore that an opposite side of the disc fitted with grating elements is usable in its entirety, even in a middle area of same.

5. Improved liquefier, according to claim 1, wherein the push piston is provided on an under side with a concavity that is oval-shaped and slightly offset from a longitudinal axis of the push piston, which engages and secures the piece of fruit or vegetable to be juiced when the liquefier is in use.

6. Improved liquefier, according to claim 1, wherein the lid that covers the liquefier unit has a recess in a front portion wherein the handle-like piece that exerts pressure on the lid proper is housed and integrated while the liquefier is in use.

7. Improved liquefier, according to claim 1 or 6, wherein the handle-like piece exerts a downward pressure by means of elastic elements or springs that keeps the handle-like piece in contact under pressure against the lid and achieves a tight seal.

8. Improved liquefier, according to claim 1 or 6, wherein due to the geometry of the claw-like ends in an angle of not more than 90° in relation to the body of the liquefier unit, when situated in the vertical position, said handle-like piece is released from the "T"-shaped heads and left completely free from the liquefier unit, so that the lid may be opened.

9. Improved liquefier, according to claim 1, wherein the aperture through the waste bin sidewall aligns with a motor ventilation outlet grille and directs the air downwards.

* * * * *

UNITED STATES PATENT AND TRADEMARK OFFICE
CERTIFICATE OF CORRECTION

PATENT NO. : 7,644,656 B2  Page 1 of 1
APPLICATION NO. : 11/665899
DATED : January 12, 2010
INVENTOR(S) : Felipe Maria Esteve Moreno It is certified that error appears in the above-identified patent and that said Letters Patent is hereby corrected as shown below:

On the title page, in item (75), in "Inventors", in column 1, line 1, delete "Moreno Esteve", and insert -- Esteve Moreno --, therefor.

Signed and Sealed this

Twenty-third Day of March, 2010

David J. Kappos
*Director of the United States Patent and Trademark Office*